US012281504B2

(12) United States Patent
Pabst et al.

(10) Patent No.: US 12,281,504 B2
(45) Date of Patent: Apr. 22, 2025

(54) DOOR PROTECTION DEVICE

(71) Applicant: WASPW, LLC, Wakeman, OH (US)

(72) Inventors: William Pabst, Wellington, OH (US); Adam Woodrum, Wakeman, OH (US)

(73) Assignee: WASPW, LLC, Wakeman, OH (US)

( * ) Notice: Subject to any disclaimer, the term of this patent is extended or adjusted under 35 U.S.C. 154(b) by 0 days.

(21) Appl. No.: 18/101,142

(22) Filed: Jan. 25, 2023

(65) Prior Publication Data

US 2023/0235603 A1 Jul. 27, 2023

Related U.S. Application Data

(60) Provisional application No. 63/302,736, filed on Jan. 25, 2022.

(51) Int. Cl.
*E05C 17/02* (2006.01)

(52) U.S. Cl.
CPC .................................... *E05C 17/02* (2013.01)

(58) Field of Classification Search
CPC ............... E05C 17/02; E05Y 2201/212; E05Y 2201/224; E05Y 2201/412; E05Y 2800/342; E05Y 2800/674; E05Y 2800/692; E05Y 2900/106; E06B 3/485; E06B 5/10; E05D 13/00; E05D 15/24; E05D 15/165; E05F 5/003
USPC .................................................... 49/197, 199
See application file for complete search history.

(56) References Cited

U.S. PATENT DOCUMENTS 4,934,439 A * 6/1990 Martin ................ E04F 21/0007 52/291
5,353,473 A * 10/1994 Sherick ................. E05D 15/165 16/DIG. 1
5,625,980 A * 5/1997 Teich ................ H04W 52/0254 49/25
6,082,046 A * 7/2000 Simmons .............. E05F 15/668 49/28
6,176,039 B1 * 1/2001 Craig ...................... E05F 15/43 49/197
6,330,901 B1 * 12/2001 Friesen ................... E06B 3/485 160/229.1
6,651,385 B2 * 11/2003 Miller ..................... E05F 15/43 49/27
6,920,717 B2 * 7/2005 Miller .................... H03K 17/94 49/27
7,600,344 B2 * 10/2009 Michaud ............... E05D 13/006 49/322

(Continued)

FOREIGN PATENT DOCUMENTS

CA 2949418 A1 * 5/2018
DE 102015119277 A1 * 4/2017 ............. E06B 3/485

*Primary Examiner* — Jerry E Redman
(74) *Attorney, Agent, or Firm* — Eschweiler & Potashnik, LLC

(57) ABSTRACT

A door protection device for a vertically moveable door is attached to a bottom panel of a garage door coupled to and moveable in a track. The door protection device comprises: a first and second portion. The first portion is configured to be attached to a door panel and extend below the door panel, and is configured to be attached flush with the door panel, optionally with a reinforcing plate therebetween. The second portion extends from the first portion and is lower than a bottom surface of the bottom panel. The second portion is bent or curved in relation to the first portion at a first angle.

20 Claims, 7 Drawing Sheets

(56) References Cited

U.S. PATENT DOCUMENTS

| | | | | |
|---|---|---|---|---|
| 7,784,520 | B2 * | 8/2010 | Paulson | E05D 15/24 160/40 |
| 7,946,332 | B2 * | 5/2011 | Hormann | E06B 7/2316 160/40 |
| 9,810,011 | B2 * | 11/2017 | Matsuo | E06B 3/48 |
| 2003/0046870 | A1 * | 3/2003 | Langenbach | E06B 9/581 49/141 |
| 2005/0273976 | A1 * | 12/2005 | Sarver | E05D 15/242 16/242 |
| 2007/0044927 | A1 * | 3/2007 | Mullet | E05D 15/242 160/201 |
| 2007/0256798 | A1 * | 11/2007 | Aquilina | E05D 15/165 160/201 |
| 2008/0023603 | A1 * | 1/2008 | Michaud | E05D 13/006 248/222.51 |
| 2009/0288344 | A1 * | 11/2009 | Schram | H04L 5/005 49/507 |
| 2012/0186158 | A1 * | 7/2012 | Sanke | E05D 13/006 49/322 |
| 2023/0003065 | A1 * | 1/2023 | Roesner | E06B 3/485 |
| 2023/0235603 | A1 * | 7/2023 | Pabst | E05D 13/00 49/197 |

* cited by examiner

DOOR PROTECTION DEVICE

CROSS-REFERENCE TO RELATED APPLICATIONS

This application claims the benefit of priority to U.S. provisional application 63/302,736, filed Jan. 25, 2022. That prior application is incorporated herein by reference for all purposes.

FIELD

This disclosure relates to vertical lift doors, such as garage doors and prevention of damage to the same.

BACKGROUND

During overhead garage door installation, there is often an interval of time between when the door panels are loaded into tracks of the door and when the operator (opening mechanism) is installed and functional. In this period of time, the door, particularly the bottom panel, is vulnerable to damage by jobsite workers who raise the door for the purposes of working in the area and who close the door with force on construction items or debris which may be in the threshold of the garage floor. This causes damage to the bottom panel of the door. In many cases it is difficult to identify the responsible party. The general contractor is then obligated to order a replacement door panel with accompanying delays and cost.

In addition, the interval between when the door panels are loaded into tracks and when the operator is installed and functional also presents a safety risk. Before the operator is installed, the door panels can move ungoverned along the tracks and are gravity driven to slam down potentially causing injury, such as to toes or hands or through flipping items on the ground up or into the air.

SUMMARY

The following is a brief summary of subject matter that is described in greater detail herein. This summary is not intended to be limiting as to the scope of the claims.

Given the problem identified with damage being caused to overhead doors prior to their operating mechanism being installed, it was determined that it would be desirable to have low-cost solution to prevent such damage.

Disclosed herein is a device that is attached to a bottom section of a panel of a door, the door including a sliding or other mechanism to facilitate vertical movement. The device is configured to buffer the bottom door from the garage floor by a short distance, thereby preventing impact with items on the floor that would otherwise collide with the bottom of door. The device is configured to deform to absorb impact if it encounters an obstacle on the floor, thereby limiting the impact on its connections to the door, preserving both the connection area to the door and the bottom surface of the door.

A method of installation and making the garage door equipped with the device is also disclosed herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
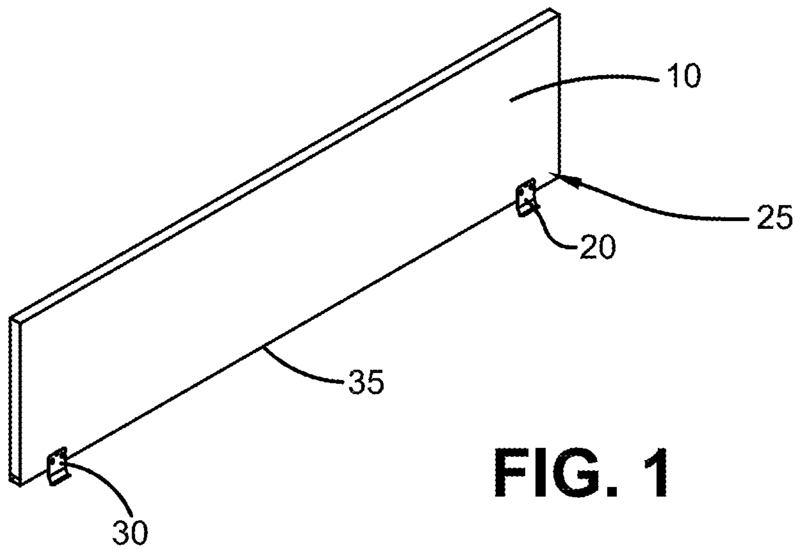
FIG. 1 is a perspective view of an embodiment of a bottom garage door panel with two exemplary door protection devices mounted on the bottom inside face of the garage door panel.

Various technologies pertaining to a door protection device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

The device disclosed herein is designed to enhance safety and prevent property damage caused by a garage or other overhead door slamming down on items laying in the floor of the door threshold. The device is attached to a bottom panel of a door and is equipped with an angled portion that protrudes beneath the door and provides a designated space, e.g., 0.75 to 6 inches, e.g., 1 to 4 inches, or 1.5 to 3 inches between the bottom of the door and the threshold floor. The angled portion absorbs the impact of door slamming down, thereby protecting the bottom surface of the door damage from any items lying in the threshold with a height that is lower than the designated space. In a particular embodiment, the device is configured to protect the door from power and propane lines that are frequently routed across the threshold of a garage door in a construction project, such as in a new home build. In an embodiment, the device can be installed under screws supplied by the door manufacturer and removed easily when the operator is installed. The term "operator," is meant to include a motorized door opener/closing device, such as a belt-, chain-, or screw-driven garage door opener.

FIG. 1 depicts a perspective view of a bottom garage door panel 25 with two exemplary door protection devices 20, 30 mounted on the bottom inside face 10 of the garage door panel. While multiple devices 20, 30 are not necessary to provide some protection to the bottom surface 35 of the door, the use of at least two devices enhances the protection and balances the weight of the door 25 better. Another advantage of using two devices 20, 30 is it allows for configuring the door protection device 20, 30 to fit with and share the same hole location on the door panel 25 as typical roller hardware. In some embodiments, three or more devices could be used for extra-large doors.

Figure 2:
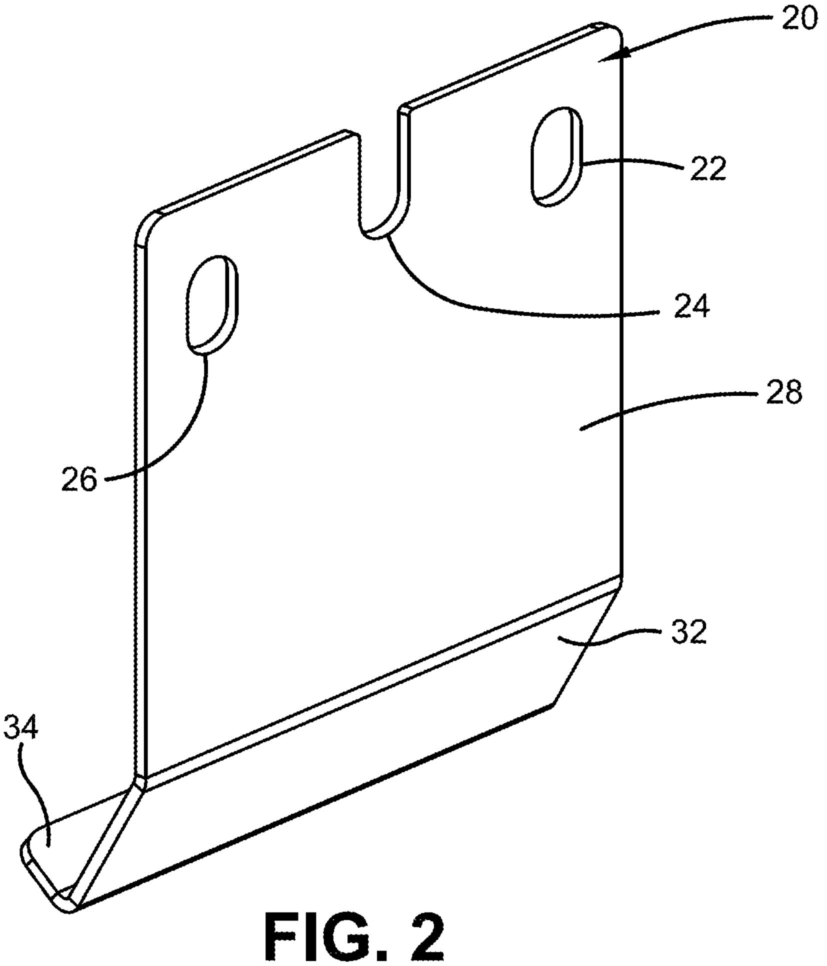
FIG. 2 is a perspective view of an embodiment of a door protection device.

FIG. 2 is a perspective view of a door protection device 20. In this embodiment, the device is made of metal, such as steel. The steel should be formulated to have some flexibility so that it will bend slightly under the weight of one or more garage door panels. The thickness of the device works in conjunction with the metal to provide a flexible yet strong guard, preventing the weight of multiple garage door panels in a door from touching the threshold floor. In an embodiment, the material and the thickness are configured to achieve two purposes: (1) to bear the residual weight of the door after the counterbalance springs are set; and (2) to yield (bend) under impact in such a way that the bottom panel of the door is not damaged by items on the floor.

Figure 4:
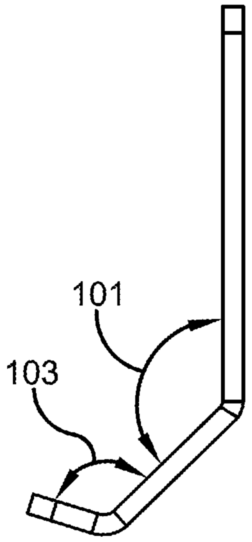
FIG. 4 is a side view of an embodiment of a door protection device, showing angles of interest.

Garage doors, for example, may weigh in a range of 70 to 255 lbs, e.g., 80 to 205 lbs, or 100 to 180 lbs. In an embodiment, the door protection device 20 is configured to deform by reducing the first angle (see FIG. 4, first angle 101) by 0.01 to 15 degrees, e.g., 0.1 to 10 degrees or 1 to 5 degrees, under a weight of 100 lbs. In an embodiment, the door protection device 20 is 0.01 to 0.25 inches in thickness, such as 0.05 to 0.15 inches in thickness, or 0.06 to 0.1 inches in thickness.

In the embodiment of FIG. 2, the door protection device 20 has two holes 22, 26, and a U-shaped opening 24 at the top. The device is configured to match existing hole patterns in the bottom panel of a commercial garage door. It is also configured to use hardware already in use on the bottom panel of a typical commercial garage door 25. However, self-tapping screws or screws driven into pre-drilled holes could be used to attach the door protection device 20 to any garage door or any vertically moveable door. In an embodiment, a bottom door panel 10 could come with the door protection device 20 attached from the manufacturer.

The U-shaped opening 24 may provide room for a protrusion from the door to fit into, or may at least reduce the weight and material costs of the door protection device 20.

The door protection device 20 has three planar sections, a first portion 28 that is configured to mount flush with a door panel or to a reinforcing plate 110 coupled to the bottom door panel (See FIG. 3), (e.g., at 90 degrees to the threshold when the door panel is installed plumb with the threshold). The second portion 32 extends from the first portion 28 and is bent or curved at an obtuse angle of, for example, 110° to 160°, such as, 120° to 150°, or 125° to 145° measured from the top portion 28 (See FIG. 4, first angle 101). The angle 101 works in conjuncture with the material type and thickness to provide the desired bending without breaking shock absorption when the door panel 25 drops without the operator any counterweight being attached.

The third portion 34 of the door protection device 20 extends from the second portion 32 and is bent or curved at an angle (see FIG. 4, second angle 103) upwards at an angle of, e.g., 110° to 30°, such as 100° to 45°, or 90° to 60° measured from the second portion 32. This bend or curve is to soften the planar edge of the door protection device 20 impacting the threshold or any items it encounters, and it provides reinforcement to the bottom planar edge. The third portion 32 could also be angled to be flush with the threshold.

Figure 3:
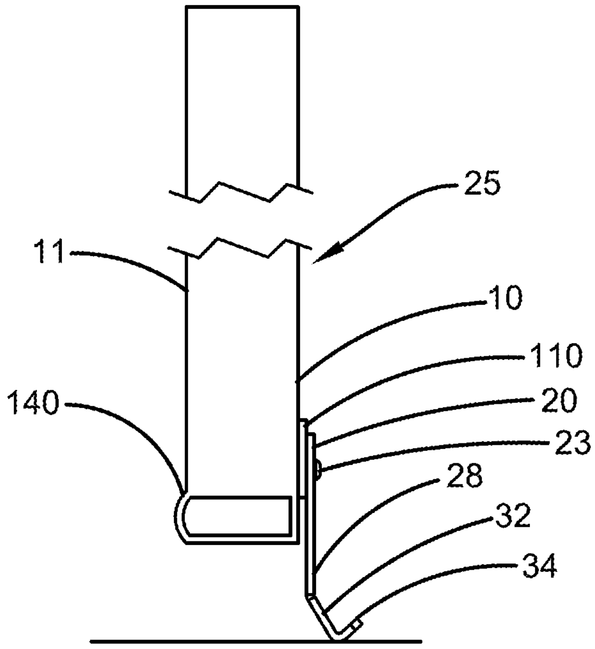
FIG. 3 is cross-sectional view of a garage door with an embodiment of a door protection device (protective clip in this figure) attached to the interior face.

FIG. 3 is cross-sectional view of a garage door with the protection device 20 coupled to the interior face 10 with a coupling to an intervening lower-edge reinforcing plate 110 at the lower edge of the door panel 10. Attachment to the interior face 10 prevents putting holes in the decorative exterior face 11. In an embodiment, the lower-edge reinforcing plate 110 is a spring mount plate or other reinforcing plate that is secured to the bottom panel 10 with multiple fasteners. The reinforcing plate 110 may be made of metal or another rigid and strong material. The reinforcing plate 110, may be at the bottom corner of the inside-facing surface of the door panel 10. The bottom edge of the reinforcing plate 110 may be located to be even with the bottom edge of the door panel 10, or slightly above the bottom edge of the door panel 10, e.g., 0.1 to 5 inches above, such as 0.3 to 3 inches above, or 0.5 to 2 inches above the bottom edge of the door panel 10.

In an embodiment, if the door panel 10 has no other attachments at the bottom corner of door, the protection device 20 may be mounted there without any reinforcing plate 110. Mounting the protection device 20 at or near the corners of the door panel 10, utilizes the vertical structure along the side edges of the door panel 10 to rigidly absorb the impact load.

In an embodiment, the door protection device 20 is configured with one or more through-holes matching fasteners used for securing the reinforcing plate 110 to the bottom panel 25. The fastener 23 extends through both the door protection device 20 and the reinforcing plate 110. Multiple fasteners 23 extending through holes 22, 26 of the door protection device 20 are contemplated, e.g., at least 2, such as 3 to 6, or 4 to 5.

In an embodiment, the garage door panel 25 is manufactured with a reinforcing plate 110 for reinforcement purposes or as part of a mount for a roller or spring. The door protection device 20 can then be attached to the bottom panel 10 by removing the pre-installed fastener 23, placing a hole 22, 26 of the door protection device 20 in line with the hole the fastener 23 was removed from, and reinstalling the fastener 23 through the door protection device 20 and the reinforcing plate 110. Alternatively, the garage door manufacturer could pre-install the door protection device 20 on the reinforcing plate 20 with the fastener 23 extending through both.

As shown, the door protection device 20 has a second portion that is angled toward the interior face 10. In other embodiments, the second portion could be angled toward the exterior face 11 (e.g., by installing it with a 180-degree horizontal rotation). Also shown in FIG. 3 is a weather seal 140, and the door protection device extends vertically down beyond the weather seal 140. In an embodiment, the door protection device 20 extends 0.75 to 6 inches below the bottom surface of the bottom panel 10, for example, 1.5 to 4 inches, or 2 to 3.5 inches.

The door protection device 20 can have various dimensions. For example, the holes 22, 26 can be sized to fit typical fasteners with a radius of 0.07 to 0.28 inches, such as 0.14 to 0.21, or 0.11 to 0.17 inches. The holes 22, 26 can have an oblong shape, wherein they are larger vertically than horizontally. This allows some adjustability as well as some potential for shock absorbing if the fastener 23 is installed near the bottom of the hole 22, 26. The U-shaped opening 24 at the top can have the same radius ranges listed above in the horizontal direction, and may range in depth from 1 to 0.23 inches, such as 0.9 to 0.38, or 0.75 to 0.45 inches. The door protection device 20 can have a width of, for example, 1 inch to 24 inches, such as, for example, 2 inches to 12 inches, or 2.75 inches to 4 inches. The door protection device 20 can have a height of 1.9 to 8.6 inches, such as, for example, 2.4 to 5, or 3.8 to 4.5 inches. The first portion 28 may have a height of 1.4 to 5.8 inches, such as 2.1 to 3.8, or 2.6 to 3.2 inches, with a width that is slightly less than the height, e.g., less than the height by 0.15 inches, plus or minus 5%, 10%, or 25% of the height. The second portion 32 may have a height of 0.5 to 2 inches, such as 0.75 to 1.5, or 0.9 to 1.1 inches, with a width that is the same as the width of the first portion 28, although other embodiments might have different widths. The third portion 34 may have a height of 0.23 to 0.9 inches, such as 0.33 to 0.56, or 0.4 to 0.5 inches, with a width that is same as the width of the first portion 28, although other embodiments might have different widths.

In an embodiment, the device is 0.01 to 0.25 inches in thickness, such as 0.05 to 0.2, or 0.7 to 0.15 inches in thickness. Related to the thickness and material composition, the device can be configured to deform by reducing the first angle by 1 to 10 degrees under a weight of 100 lbs, such as, for example, 2 to 8 degrees or 3 to 7 degrees.

Figure 5:
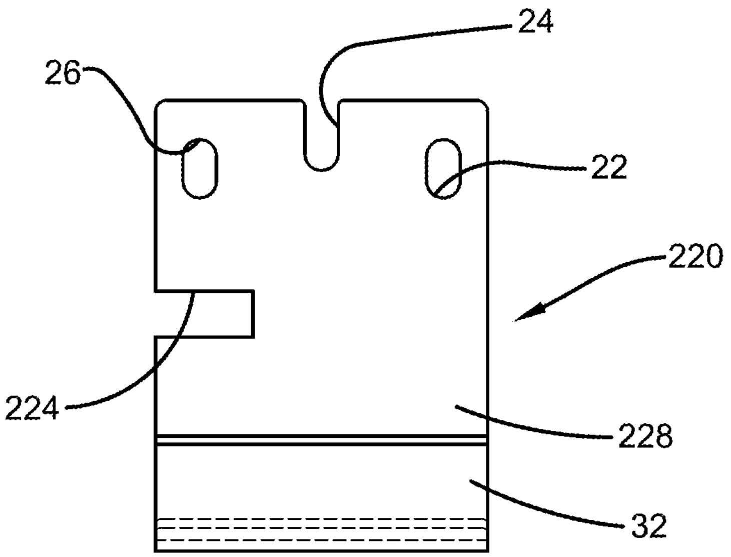
FIG. 5 is a front view of a second embodiment of a door protection device.

FIG. 5 is front view of another embodiment of a door protection device 220. This embodiment differs from the embodiment of FIGS. 1-4 in that the first portion 228 includes a side cut-out 224, which configures the protection device 220 to fit with a reinforcing plate 240 (FIG. 6), i.e., a spring mount plate, of a commercial garage door. The other features of this embodiment of the door protection device 220 are the same and are labeled accordingly.

Figure 6:
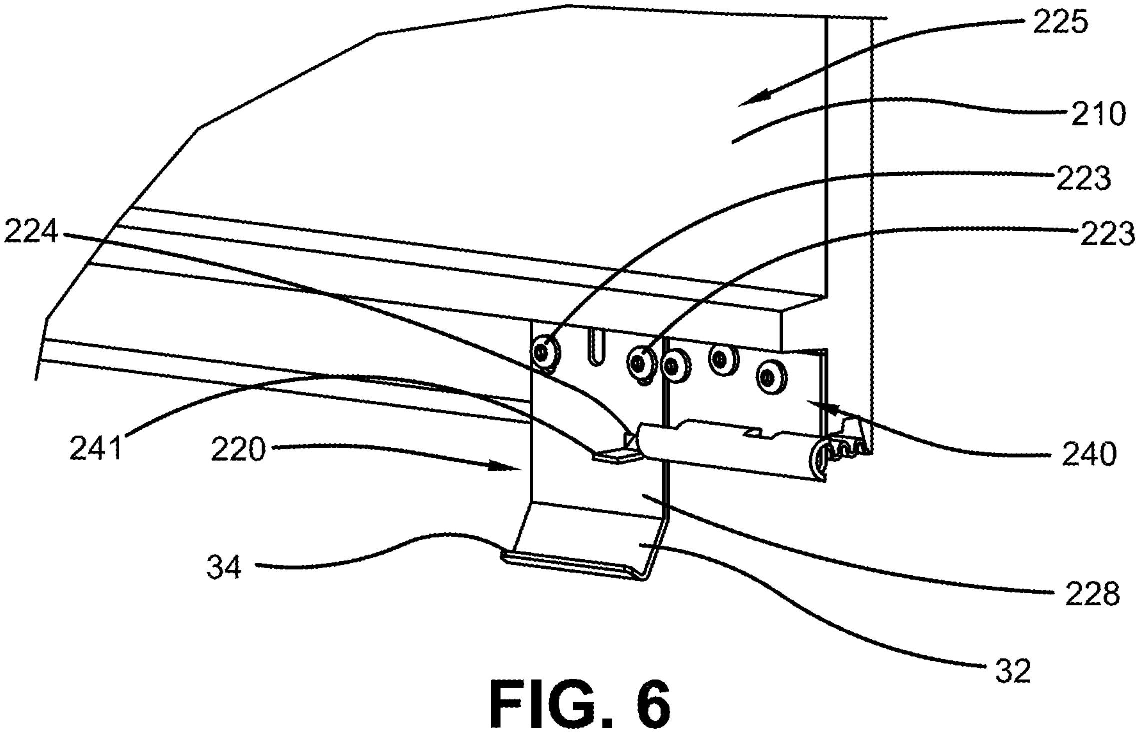
FIG. 6 is a perspective view from the inside of a garage of the second embodiment of the door protection device installed on the bottom panel of a garage door.

FIG. 6 is a perspective view of the other embodiment of the door protection device 220 installed on the bottom panel 210 of a garage door 225. The utility of the side cut-out 224 is apparent here. A tab 241 extends from the reinforcing metal plate 240 and the side cut-out 224 is dimensioned to allow the tab 241 to pass through it, while having at least one hole 26 that is aligned with a fastener 223 for the reinforcing plate 240, while the protection device 220 extends sufficiently below the bottom edge of the door panel 210 to provide spacing, e.g., 0.75 to 6 inches, to prevent damage if the door 225 slams down onto a power cord, propane line, tool, pipe, foot, or other object. In an embodiment, two or more fasteners 223 may be used to go through holes in both the reinforcing plate 240 and the protection device 220.

Figure 7:
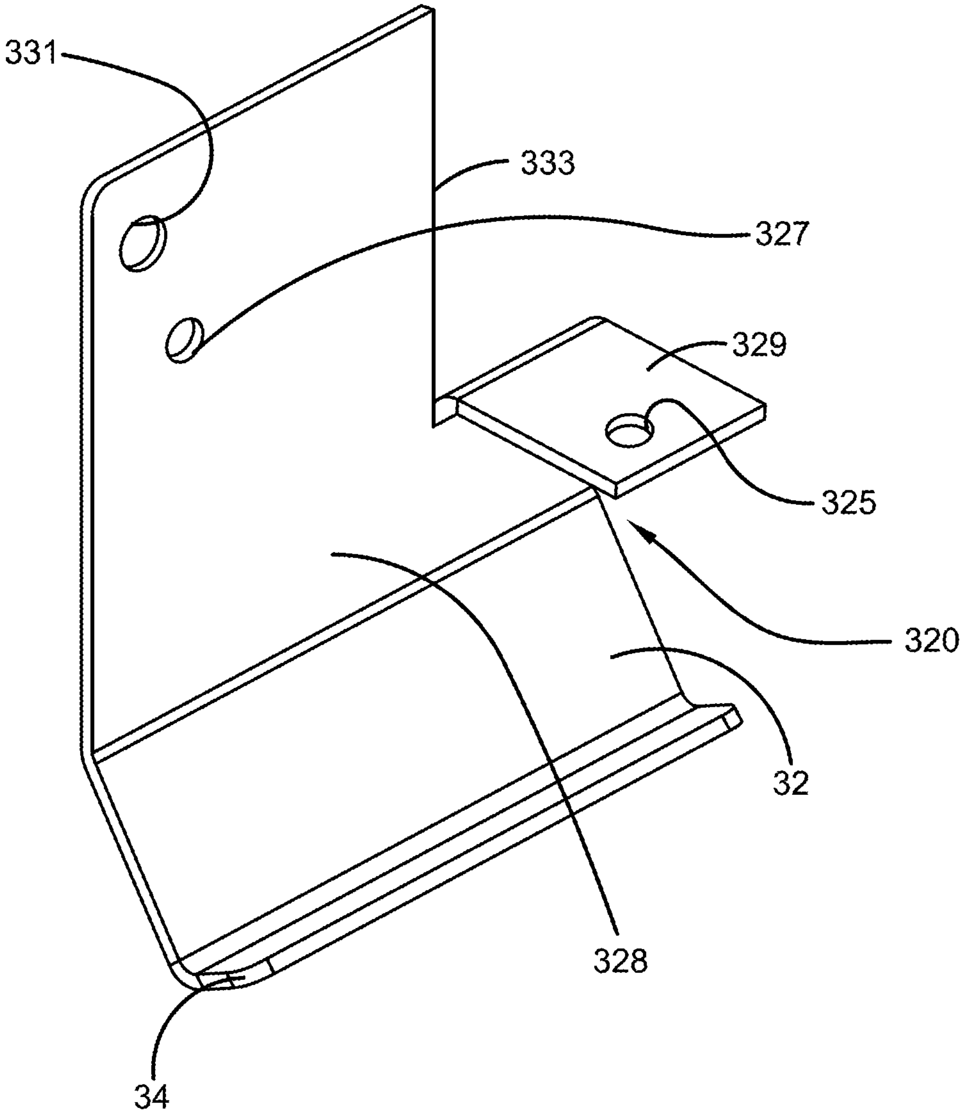
FIG. 7 is a perspective view of a third embodiment of a door protection device.

FIG. 7 is a perspective view of a third embodiment of a door protection device 320. This embodiment differs from the embodiment of FIGS. 1-4 in that the first portion 328 includes a corner cut-out 333 and an angled tab 329 with a hole 325. Holes 327, 332 for fasteners are also spaced differently in this embodiment of the door protection device 320. These features configure the protection device 320 to fit with a reinforcing plate 340 (FIG. 8), e.g., a spring mount plate, of a commercial garage door. The other features of this embodiment of the door protection device 320 are the same and are labeled accordingly.

Figure 8:
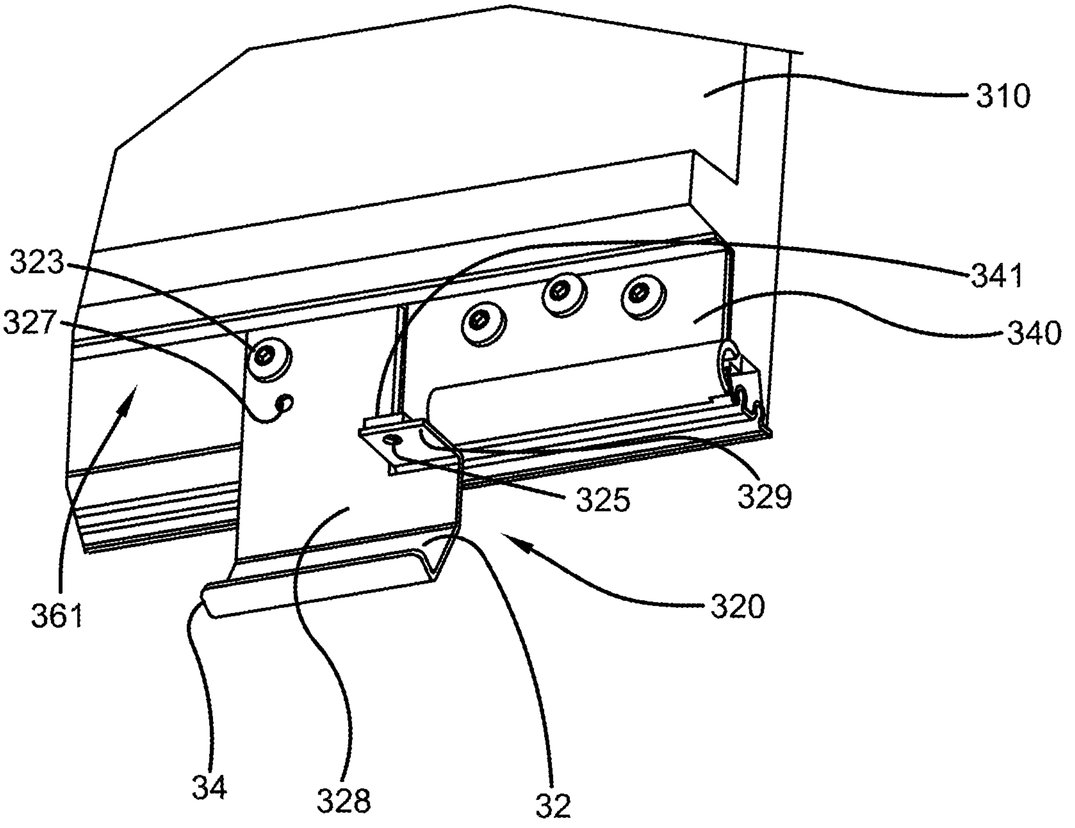
FIG. 8 is a perspective view from the inside of a garage of the fourth embodiment of the door protection device installed on the bottom panel of a garage door.

FIG. 8 is a perspective view of the third embodiment of the door protection device 320 installed on the bottom panel 310 of a garage door. The utility of the corner cut-out 333 and angled tab 329 is apparent here. A tab 341 extends from the reinforcing metal plate 340 and the corner cut-out 333 is dimensioned to allow the tab 341 to pass through it. The angled tab 329 of the door protection device 320 is configured to abut the tab 341 of the reinforcing metal plate 340. Both the tab 341 and the angled tab 329 are angled at 90 degrees from the door protection device 320 and the reinforcing metal plate 340 and are configured to have faces that are flush when installed. In addition, a fastener may join the tab 341 and the angled tab 329 through hole 325 extending through a matching hole in the tab 341. The abutting tabs 341 and angled tab 329 provide additional stability to the assembled door protection device 320.

The panel 310 of FIG. 8, may have an additional reinforcing strip 361 onto which the door protection device 320 is attached. At least one of hole 327 or hole 333 is aligned to match holes in the reinforcing strip 361 for a fastener (e.g., fastener 323) to go through. The protection device 320 extends sufficiently below the bottom edge of the door panel 310 to provide spacing, e.g., 0.75 to 6 inches, to prevent damage if the panel 310 slams down onto a power cord, propane line, tool, pipe, foot, or other object. In an embodiment, two or more fasteners may be used to go through holes in both the reinforcing strip 361 and/or reinforcing metal plate 340 and the protection device 320.

Figure 9:
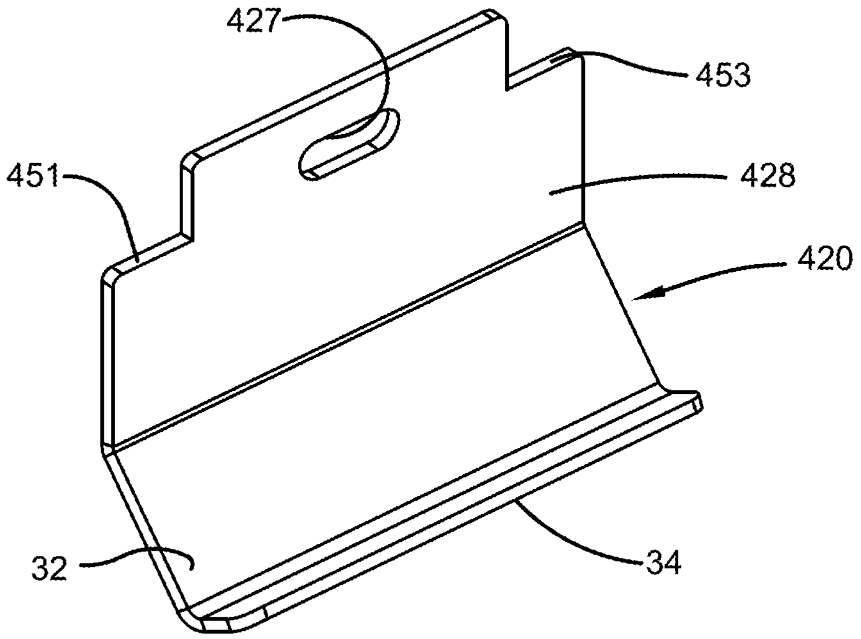
FIG. 9 is a perspective view of a fourth embodiment of a door protection device.

FIG. 9 is a perspective view of a fourth embodiment of a door protection device 420. This embodiment differs from the embodiment of FIGS. 1-4 in that the first portion 428 includes two corner cut-outs 451, 453. A hole 427 for a fastener is also spaced differently in this embodiment of the door protection device 420. These features configure the protection device 420 to fit with a reinforcing plate 440 (FIG. 10), e.g., a spring mount plate, of a commercial garage door. These features configure the protection device 420 to fit with a reinforcing plate 440 (FIG. 10), e.g., a spring mount plate, of a commercial garage door. The other features of this embodiment of the door protection device 320 are the same and are labeled accordingly.

Figure 10:
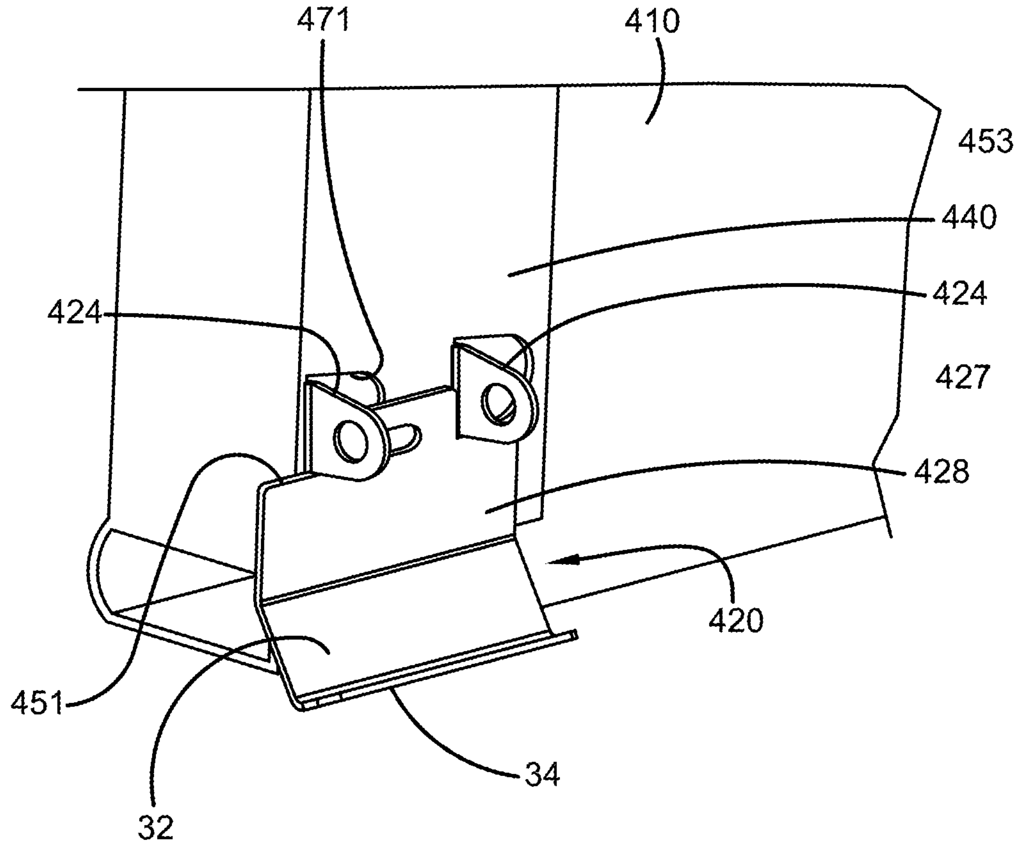
FIG. 10 is a perspective view from the inside of a garage of the fourth embodiment of the door protection device installed on the bottom panel of a garage door.

FIG. 10 is a perspective view of the fourth embodiment of the door protection device 420 installed on the bottom panel 410 of a garage door. The utility of the corner cut-outs 451, 453 is apparent here. Vertical tabs 424 extend from the reinforcing metal plate 440 installed on the bottom panel 410, and the tabs 451, 452 are folded out at 90 degrees from the vertical surface of the metal reinforcing plate 440 leaving an opening 471 in the metal reinforcing plate 440. The corner cut-outs 451, 453 are dimensioned to allow the tabs 451, 453 to pass through the door protection device 420, allowing the door protection device 420 to fit flush with the vertical surface of the reinforcing metal plate 440.

A fastener may join the door protection device 420 and the metal reinforcing plate to the door panel 410 through a hole 427 extending through the opening 471 in the metal reinforcing plate 440. In another embodiment, a hole can be drilled through the metal reinforcing plate 440 if the hole 427 does not line up with an opening 471 in the metal reinforcing plate 440.

Dimensions of the second, third, and fourth embodiments of the door protection device 220, 320, 420 can be selected from those set forth above for the door protection device 20 of FIGS. 1-4. The side and corner cut-outs can be have dimensions (either height or width) of 0.5 to 4.5 inches, such as 0.7 to 3.8, or 1 to 3 inches, In an exemplary method of use, a set of vertically moving door panels are installed in a track. Prior to connecting an operating unit for the door, a door protection device 20 is installed on the bottom door panel of the set of vertically moving door panels. Optionally two or more door protection devices 20 are installed. In an embodiment, the door protection device 20 is installed with screws in preexisting holes in the door panel or in a reinforcing plate 110. This makes installation easier for the user and does not require drilling holes in the intact garage door. In another embodiment the holes are drilled in the door by the end user and screws are inserted in the holes. In an embodiment, the end user may install a reinforcing plate along with the door protection device 20. While the door protection device 20 is mentioned here specifically, other embodiments of the door protection device 220, 320, 420 can also be used with the method.

After installation of the operator, the protection devices 20 are removed, as modern garage door operation systems have optical and/or resistance detection that prevent damage to the door or underlying objects.

In an exemplary method of making, the protection device is made by a laser cutting method. A blank part is laser cut from sheet steel and then formed to the desired shape in a brake press. In another method of making the part is stamped and formed in a single operation in a stamping press. This could be a progressive operation with a blanking step and then the part would be indexed to another location in the press where it would be formed to final shape.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A door protection device, comprising:

a first portion and a second portion;

the first portion configured to be coupled to a door panel and extending below the door panel, and configured to be flush with the door panel;

the second portion extending from the first portion and is bent or curved at a first angle of 110° to 160° from the first portion;

wherein the first portion of the door protection device has a side or corner cut out;

wherein a side or corner cut-out of the first portion is configured to fit a tab on a reinforcing plate of a door.

2. The door protection device of claim 1, further comprising a third portion extending from the second portion.

3. The door protection device of claim 1, wherein a third portion extends from the second portion and is bent or curved at an angle of 110° to 30° from the second portion.

4. The door protection device of claim 1, wherein the first portion includes holes configured to match pre-drilled holes in a garage door.

5. The door protection device of claim 1, wherein the door protection device is made of steel.

6. The door protection device of claim 1, wherein the door protection device is configured to deform by reducing the first angle by 1 to 10 degrees under a weight of 100 lbs.

7. The door protection device of claim 1, wherein the door protection device is 0.01 to 0.25 inches in thickness.

8. A vertically moveable door comprising:

a bottom panel moveable in a track;

a door protection device, comprising:

a first and second portion;

the first portion configured to be coupled to a door panel and extending below the door panel, and configured to be flush with the door panel;

the second portion extending from the first portion and is lower than a bottom surface of the bottom panel, the second portion being bent or curved in relation to the first portion at a first angle;

wherein the first portion of the door protection device has a side or corner cut out;

wherein a tab on a reinforcing plate on the door fits through the side or corner cut-out.

9. The vertically moveable door of claim 8, wherein the second portion is bent or curved at a first angle of 11020 to 160° from the first portion.

10. The vertically moveable door of claim 8, wherein the door protection device extends 0.75 to 6 inches below the bottom surface of the bottom panel.

11. The vertically moveable door of claim 8, wherein the first portion includes holes configured to match pre-drilled holes in the lower door panel.

12. The vertically moveable door of claim 8, wherein the door protection device is made of steel.

13. The vertically moveable door of claim 8, wherein the door protection device is configured to deform by reducing the first angle by 1 to 10 degrees under a weight of 100 lbs.

14. The vertically moveable door of claim 8, wherein the door protection device is 0.01 to 0.25 inches in thickness.

15. The vertically moveable door of claim 8, wherein a third portion extends from the second portion and is bent or curved at an angle of 110° to 30° from the second portion.

16. The vertically moveable door of claim 8, wherein the vertically moveable door is not coupled to an operating device.

17. A vertically moveable door comprising:

a bottom panel vertically moveable along a track;

a reinforcing plate attached to the bottom panel;

a door protection device coupled to the bottom panel, with the reinforcing plate therebetween, the door protection device comprising:

a first and second portion;

the first portion coupled to the bottom panel and extending below the bottom panel;

the second portion extending from the first portion and is lower than a bottom surface of the bottom panel, the second portion being bent or curved in relation to the first portion at a first angle;

wherein the first portion of the door protection device has a side or corner cut-out;

wherein a tab on the reinforcing plate fits through the side or corner cut-out.

18. The vertically moveable door of claim 17, wherein the door protection device extends 0.75 to 6 inches below the bottom surface of the bottom panel.

19. The vertically moveable door of claim 17, wherein the door protection device is configured to deform by reducing the first angle by 1 to 10 degrees under a weight of 100 lbs.

20. The vertically moveable door of claim 17, wherein a third portion extends from the second portion and is bent or curved at an angle of 110° to 30° from the second portion.

* * * * *